US012091640B1

(12) United States Patent
Arkin et al.

(10) Patent No.: US 12,091,640 B1
(45) Date of Patent: Sep. 17, 2024

(54) ECO-FRIENDLY, LIQUIDLESS LAUNDRY SHEET COMPRISING A MATRIX OF NATURAL MATERIALS

(71) Applicant: Venus Laboratories, Inc., Cypress, CA (US)

(72) Inventors: Jenna A. Arkin, Long Beach, CA (US); Ryan K. Hood, Huntington Beach, CA (US); Trung T. Phan, Rosemead, CA (US)

(73) Assignee: Venus Laboratories, Inc., Cypress, CA (US)

( * ) Notice: Subject to any disclaimer, the term of this patent is extended or adjusted under 35 U.S.C. 154(b) by 0 days.

(21) Appl. No.: 18/464,910

(22) Filed: Sep. 11, 2023

Related U.S. Application Data

(63) Continuation of application No. 17/823,899, filed on Aug. 31, 2022, now Pat. No. 11,753,609.

(60) Provisional application No. 63/239,849, filed on Sep. 1, 2021.

(51) Int. Cl.

| | |
|---|---|
| ***C11D 17/06*** | (2006.01) |
| ***C11D 1/12*** | (2006.01) |
| ***C11D 1/62*** | (2006.01) |
| ***C11D 1/86*** | (2006.01) |
| ***C11D 3/22*** | (2006.01) |
| ***C11D 3/386*** | (2006.01) |

(52) U.S. Cl.
CPC ................ *C11D 17/06* (2013.01); *C11D 1/12* (2013.01); *C11D 1/62* (2013.01); *C11D 1/86* (2013.01); *C11D 3/222* (2013.01); *C11D 3/38609* (2013.01)

(58) Field of Classification Search
CPC ........... C11D 17/06; C11D 1/12; C11D 3/222; C11D 1/86; C11D 3/38609; C11D 1/62
See application file for complete search history.

(56) References Cited

U.S. PATENT DOCUMENTS

| | | | | |
|---|---|---|---|---|
| 5,358,780 | A | 10/1994 | Kafchinski et al. | |
| 6,130,193 | A | 10/2000 | Gillette | |
| 7,226,899 | B2 | 6/2007 | Cole et al. | |
| 8,216,993 | B2 | 7/2012 | Peltz et al. | |
| 8,367,596 | B2 | 2/2013 | Fossum et al. | |
| 8,450,263 | B2 | 5/2013 | Panandiker et al. | |
| 8,785,361 | B2 | 7/2014 | Sivik et al. | |
| 9,464,264 | B2 | 10/2016 | Jalbert et al. | |
| 10,639,825 | B2 | 5/2020 | Jalbert et al. | |
| 10,738,265 | B2 | 8/2020 | Shearouse et al. | |
| 11,753,609 | B1 * | 9/2023 | Arkin | C11D 17/042 510/445 |
| 2014/0135250 | A1 | 5/2014 | Weller-Brophy et al. | |
| 2016/0035569 | A1 | 2/2016 | Toms et al. | |
| 2016/0355769 | A1 * | 12/2016 | Toms | C11D 3/38627 |
| 2017/0226690 | A1 | 8/2017 | Brain et al. | |
| 2017/0280716 | A1 | 10/2017 | Lan et al. | |
| 2017/0335510 | A1 | 11/2017 | Welch et al. | |
| 2018/0223229 | A1 | 8/2018 | Tan et al. | |
| 2019/0055498 | A1 * | 2/2019 | Burgan | C11D 1/66 |
| 2020/0010784 | A1 * | 1/2020 | Cho | C11D 3/386 |
| 2021/0112437 | A1 | 4/2021 | Wu et al. | |
| 2021/0137798 | A1 | 5/2021 | Sivik et al. | |
| 2021/0238514 | A1 | 8/2021 | Janssen et al. | |
| 2022/0403301 | A1 * | 12/2022 | Soane | D21H 21/10 |

FOREIGN PATENT DOCUMENTS

| | | |
|---|---|---|
| EP | 2 800 802 | 11/2014 |
| WO | WO 2001016262 | 3/2001 |

* cited by examiner

*Primary Examiner* — Charles I Boyer
(74) *Attorney, Agent, or Firm* — Knobbe, Martens, Olson & Bear, LLP

(57) ABSTRACT

Provided herein are formulations for liquidless cleansing products having high biobased content. The cleansing formulations may be substantially free of polyvinyl alcohol. The cleansing composition may contain no more than a negligible amount of polyvinyl alcohol. The cleansing composition may contain no detectable amount of polyvinyl alcohol.

19 Claims, 1 Drawing Sheet

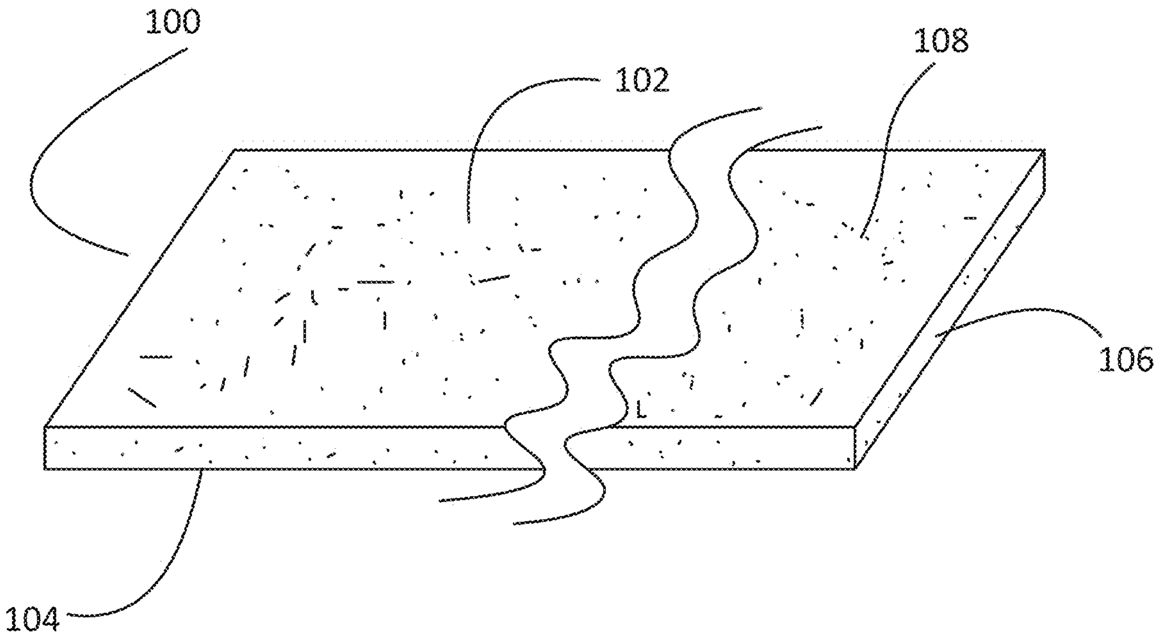
100
102
108
106
104

ECO-FRIENDLY, LIQUIDLESS LAUNDRY SHEET COMPRISING A MATRIX OF NATURAL MATERIALS

INCORPORATION BY REFERENCE TO ANY PRIORITY APPLICATIONS

Any and all applications for which a foreign or domestic priority claim is identified in the Application Data Sheet or Request as filed with the present application are hereby incorporated by reference in their entirety under 37 CFR 1.57, and Rules 4.18 and 20.6. This application is a continuation of U.S. application Ser. No. 17/823,899, filed Aug. 31, 2022, and claims the benefit of U.S. Provisional Application No. 63/239,849, filed Sep. 1, 2021.

BACKGROUND

Field

The present disclosure generally relates to cleansing compositions, and more particularly, eco-friendly cleansing compositions.

Description of the Related Art

As consumer demand for sustainable products continues to grow, the biobased content of household consumer products has become increasingly important. Biobased content refers to the percentage of product that is made from natural, renewable sources such as plant or agricultural-based. It generally represents the ratio of carbon from plants to the total carbon in the product which can include fossil fuel-based carbon. Carbon-14 analysis is typically used to verify the biobased content. A measurement of a product's $^{14}C/^{12}C$ or $^{14}C/^{13}C$ content is determined relative to a carbon-based modern reference material accepted by the radiocarbon dating community such as NIST Standard Reference Material (SRM) 4990C. The result is cited as percent modern carbon (pMC) and reported as percent biobased carbon content (or percent biobased content).

Commercially available laundry detergent products have high biobased content, but such detergent products are typically liquid detergent products. Commercially available solid detergent sheets typically contain a substantial amount of polyvinyl alcohol (PVA), a petroleum derived compound that functions as a temporary binder. Because of its art-recognized binding strength and water solubility, PVA is commonly used to form the polymer matrix of solid detergent sheets. Even though PVA is not a renewable resource and lowers the biobased content of the product in which it is used, manufacturers continue to rely heavily on PVA in liquidless detergent products, such as solid detergent sheets, due to the lack of suitable alternatives to PVA and the lack of suitable alternative methods for forming a dissolvable matrix that can effectively bind detergents in sheet form.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Some embodiments of the present disclosure relate to liquidless cleansing composition, including: a detergent component; and a water-soluble matrix configured to suspend and bind the detergent component, wherein the matrix is substantially free of polyvinyl alcohol; wherein the water-soluble matrix has a thickness between about 0.5 mm to about 2 mm. In some embodiments, the water-soluble matrix includes a biobased binder. In some embodiments, the biobased binder is selected from the group consisting of hydroxyethyl cellulose, gum acacia, cellulose, *Zea mays* starch, *Oryza sativa* starch, sodium polyitaconate, hydroxypropyl cellulose, tapioca starch, and poly(2-ethyl-2-oxazoline), and combinations thereof. In some embodiments, the biobased binder is hydroxyethyl cellulose. In some embodiments, the water-soluble matrix comprises greater than 80 wt. % plant-based carbon. In some embodiments, the detergent component and the water-soluble matrix together form a water-soluble laundry detergent composition. In some embodiments, the water-soluble laundry detergent composition is in the form of a sheet.

Other embodiments of the present disclosure relate to a cleansing composition, including a detergent component and a biobased binder, wherein the biobased binder includes from about 17 to about 23 weight percent of the cleansing composition. In some embodiments, the cleansing composition includes no more than 10% by weight water. In some embodiments, the cleansing composition is in the form of a sheet. In some embodiments, the cleansing composition is substantially free of polyvinyl alcohol. In some embodiments, the cleansing composition contains no more than a negligible amount of polyvinyl alcohol. In some embodiments, the cleansing composition contains no detectable amount of polyvinyl alcohol.

Further embodiments of the present disclosure relate to a cleaning composition including: 6-12 wt. % coco-glucoside; 17-23 wt. % sodium coco-sulfate; 2-8 wt. % silicon dioxide; 3-9 wt. % cocamidopropyl betaine; 0.1-4 wt. % glycerol; 0.1-4 wt. % sodium citrate; 0.1-4 wt. % cocamidopropylamine oxide; 0.1-4 wt. % saponins; 0.1-2 wt. % phenoxyethanol; 0.1-2 wt. % subtilisin protease; 14-20 wt. % kaolin; 0.1-2 wt. % citric acid; 17-23 wt. % hydroxyethyl cellulose; and 0-10 wt. % water. In some embodiments, the composition is substantially free of polyvinyl alcohol. In any embodiment, the pMC of the composition is over 65%.

Some embodiments of the present disclosure relate to a cleansing composition, include: coco-glucoside; sodium coco-sulfate; cocamidopropyl betaine; cocamidopropylamine oxide; saponins; subtilisin protease; and a biobased binder selected from the group consisting of hydroxyethyl cellulose, gum acacia, cellulose, *Zea mays* starch, *Oryza sativa* starch, sodium polyitaconate, a natural polymer solution, hydroxypropyl cellulose, tapioca starch, and poly(2-ethyl-2-oxazoline); wherein the composition is substantially free of water. In some embodiments, the cleansing composition is in sheet form. In some embodiments, the cleansing composition includes negligible to no polyvinyl alcohol.

Other embodiments of the present disclosure relate to a cleansing composition, including: a non-ionic surfactant; an anionic surfactant; a fatty acid amide; an enzyme; and a binding agent, wherein the binding agent forms a liquidless matrix including greater than 80 wt. % plant-based carbon; and wherein the composition is substantially free of water. In some embodiments, the non-ionic surfactant is selected from the group consisting of coco-glucoside, cocamidopropylamine oxide and saponins. In some embodiments, the anionic surfactant is sodium coco-sulfate. In some embodiments, the fatty acid amide is cocamidopropyl betaine. In some embodiments, the enzyme is subtilisin protease. In some embodiments, the binding agent is selected from the group consisting of hydroxyethyl cellulose, gum acacia, cellulose, *Zea mays* starch, *Oryza sativa* starch, sodium polyitaconate, a natural polymer solution, hydroxypropyl cellulose, tapioca starch, and poly(2-ethyl-2-oxazoline). In some embodiments, the cleansing composition is substantially free of polyvinyl alcohol. In some embodiments, the cleansing composition includes less than 10 wt. % polyvinyl alcohol. In some embodiments, the cleansing composition contains no more than a negligible amount of polyvinyl alcohol. In further embodiments, the cleansing composition the binding agent includes hydroxyethyl cellulose.

Further embodiments of the present disclosure relate to a solid cleansing composition, including a matrix, wherein the matrix includes a biobased binder. In some embodiments, the biobased binder is hydroxyethyl cellulose. In some embodiments, the biobased binder is polyvinyl alcohol. In some embodiments, the solid cleansing composition further includes a surfactant. In some embodiments, the surfactant is selected from the group consisting of coco-glucoside, sodium coco-sulfate, cocamidopropyl betaine, cocamidopropylamine oxide and saponins. In other embodiments, the solid cleansing composition further includes an enzyme. In some embodiments, the enzyme is subtilisin protease.

Some embodiments of the present disclosure relate to a detergent composition, including a matrix, wherein the matrix comprises a compound of Formula (I):

(I)

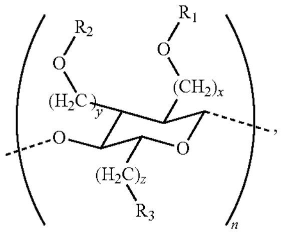

wherein: $R_1$ and $R_2$ are each independently an optionally substituted $C_{1-12}$ alkyl or H; $R_3$ is an optionally substituted $C_{1-12}$ alkyl, H, —OH, or —$OR_a$; $R_a$, is an optionally substituted $C_{1-12}$ alkyl; each of x, y, and z is independently 0, 1, 2, 3, 4, 5 or 6; and n is an integer from 1 to about 10,000. In some embodiments, x and y are each 0, and z is 1. In some embodiments, $R_1$, $R_2$, and $R_3$ are each independently selected from the group consisting of H and (—$CH_2CH_2OH$—). In some embodiments, the compound of Formula (I) is selected from the group consisting of

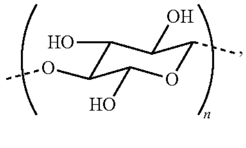
,
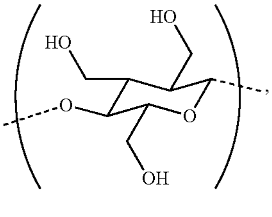
,

-continued

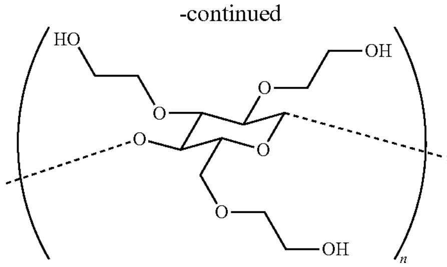
,
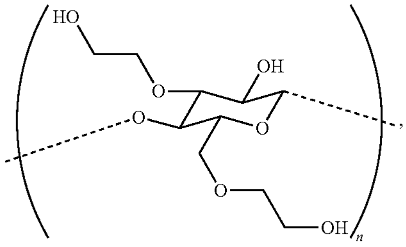
,
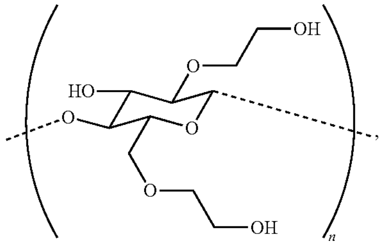
,
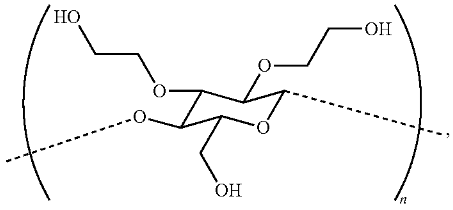
,
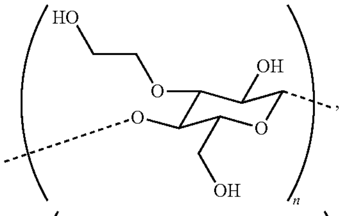
, and
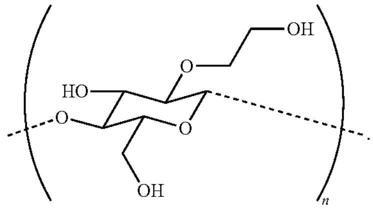
.

In some embodiments, the detergent composition further includes a surfactant. In further embodiments, the surfactant is selected from the group consisting of coco-glucoside, sodium coco-sulfate, cocamidopropyl betaine, cocamidopropylamine oxide and saponins.

BRIEF DESCRIPTION OF THE DRAWINGS

The foregoing and other features of the present disclosure will become more fully apparent from the following description and appended claims, taken in conjunction with the accompanying drawing.

FIG. 1 depicts, schematically, a solid detergent sheet in accordance with certain embodiments of the present disclosure.

DETAILED DESCRIPTION

Embodiments of systems, components, and methods of assembly and manufacture are described, wherein like numerals refer to like or similar elements throughout. Although several embodiments, examples and illustrations are disclosed below, it will be understood by those of ordinary skill in the art that the disclosure extends beyond the specifically disclosed embodiments, examples, and illustrations, and would be understood to include other uses of the inventions and various modifications and equivalents thereof. The terminology used in the description, as presented herein, is not intended to be interpreted in any limited or restrictive manner simply because it is being used in conjunction with a detailed description of certain specific embodiments of the inventions. In addition, embodiments of the inventions can comprise several novel features and no single feature is solely responsible for its attributes, nor is any single feature essential to practicing the embodiments of the inventions herein described.

A high biobased content cleansing composition in solid sheet form having a polysaccharide-based matrix is described. The high biobased content cleansing composition may be, in certain embodiments, a solid detergent sheet comprising a matrix comprising of a biobased binder. The biobased binder-comprising matrix may, be, in certain embodiment, a polysaccharide-based matrix. The matrix provides a backbone that is configured to suspend the detergent components of the cleansing composition when in solid form and to dissolve, releasing the detergent components when the matrix contacts a sufficient volume of water. The matrix has a structure that serves certain functions of PVA is commercially available solid detergent sheets, that is, it can serve as a backbone matrix to bind and hold the detergent components when in sheet form and can release the detergent components when in contact with a sufficient content of water. Thus, in certain embodiments of the present invention, the biobased matrix serves as an effective replacement of PVA in solid detergent sheets and other solid cleansing products.

As used herein, any "R" group(s) represent substituents that can be attached to the indicated atom. An R group may be substituted or unsubstituted.

Whenever a group is described as being "optionally substituted" that group may be unsubstituted or substituted with one or more of the indicated substituents. Likewise, when a group is described as being "substituted", the substituent may be selected from one or more of the indicated substituents. If no substituents are indicated, it is meant that the indicated "optionally substituted" or "substituted" group may be one or more group(s) individually and independently selected from alkyl (e.g., $C_1$-$C_6$ alkyl); alkenyl (e.g., $C_2$-$C_6$ alkenyl); alkynyl (e.g., $C_2$-$C_6$ alkynyl); $C_3$-$C_8$ carbocyclyl (for example, $C_3$-$C_8$ cycloalkyl, $C_3$-$C_8$ cycloalkenyl, or $C_3$-$C_8$ cyclalkynyl, each may further be optionally substituted, for example, with halo, $C_1$-$C_6$ alkyl, $C_1$-$C_6$ alkoxy, $C_1$-$C_6$ haloalkyl, $C_1$-$C_6$ haloalkoxy, ($C_1$-$C_6$ alkoxy)$C_1$-$C_6$ alkyl, or —O($C_1$-$C_6$ alkoxy)$C_1$-$C_6$ alkyl); ($C_3$-$C_7$ carbocyclyl)$C_1$-$C_6$ alkyl (may further be optionally substituted, for example, with halo, $C_1$-$C_6$ alkyl, $C_1$-$C_6$ alkoxy, $C_1$-$C_6$ haloalkyl, $C_1$-$C_6$ haloalkoxy, ($C_1$-$C_6$ alkoxy)$C_1$-$C_6$ alkyl, or —O($C_1$-$C_6$ alkoxy)$C_1$-$C_6$ alkyl); 5-10 membered heterocyclyl (may further be optionally substituted, for example, with halo, $C_1$-$C_6$alkyl, $C_1$-$C_6$ alkoxy, $C_1$-$C_6$ haloalkyl, $C_1$-$C_6$ haloalkoxy, ($C_1$-$C_6$ alkoxy)$C_1$-$C_6$ alkyl, or —O($C_1$-$C_6$ alkoxy)$C_1$-$C_6$ alkyl); (5-10 membered heterocyclyl)$C_1$-$C_6$ alkyl (may further be optionally substituted, for example, with halo, $C_1$-$C_6$ alkyl, $C_1$-$C_6$ alkoxy, $C_1$-$C_6$ haloalkyl, $C_1$-$C_6$ haloalkoxy, ($C_1$-$C_6$ alkoxy)$C_1$-$C_6$ alkyl, or —O($C_1$-$C_6$ alkoxy)$C_1$-$C_6$ alkyl); aryl (may further be optionally substituted, for example, with halo, $C_1$-$C_6$ alkyl, $C_1$-$C_6$ alkoxy, $C_1$-$C_6$ haloalkyl, $C_1$-$C_6$ haloalkoxy, ($C_1$-$C_6$ alkoxy)$C_1$-$C_6$ alkyl, or —O($C_1$-$C_6$ alkoxy)$C_1$-$C_6$ alkyl); (aryl)$C_1$-$C_6$ alkyl (may further be optionally substituted, for example, with halo, $C_1$-$C_6$ alkyl, $C_1$-$C_6$ alkoxy, $C_1$-$C_6$ haloalkyl, $C_1$-$C_6$ haloalkoxy, ($C_1$-$C_6$ alkoxy)$C_1$-$C_6$ alkyl, or —O($C_1$-$C_6$ alkoxy)$C_1$-$C_6$ alkyl); 5-10 membered heteroaryl (may further be optionally substituted with halo, $C_1$-$C_6$ alkyl, $C_1$-$C_6$ alkoxy, $C_1$-$C_6$ haloalkyl, $C_1$-$C_6$ haloalkoxy, ($C_1$-$C_6$ alkoxy) $C_1$-$C_6$ alkyl, or —O($C_1$-$C_6$ alkoxy)$C_1$-$C_6$ alkyl); (5-10 membered heteroaryl)$C_1$-$C_6$ alkyl (may further be optionally substituted with halo, $C_1$-$C_6$ alkyl, $C_1$-$C_6$ alkoxy, $C_1$-$C_6$ haloalkyl, $C_1$-$C_6$ haloalkoxy, ($C_1$-$C_6$ alkoxy)$C_1$-$C_6$ alkyl, or —O($C_1$-$C_6$ alkoxy)$C_1$-$C_6$ alkyl); halo (e.g., fluoro, chloro, bromo, iodo); cyano; hydroxy; protected hydroxy; alkoxy (e.g., $C_1$-$C_6$ alkoxy); haloalkyl (e.g., $C_1$-$C_6$ haloalkyl, such as —$CF_3$); haloalkyl (e.g., $C_1$-$C_6$ haloalkoxy such as —$OCF_3$); ($C_1$-$C_6$ alkoxy)$C_1$-$C_6$ alkyl; —O($C_1$-$C_6$ alkoxy) $C_1$-$C_6$ alkyl; ($C_1$-$C_6$ haloalkoxy)$C_1$-$C_6$ alkyl; —O($C_1$-$C_6$ haloalkoxy)$C_1$-$C_6$ alkyl; aryloxy; sulfhydryl (mercapto); alkylthio (e.g., $C_1$-$C_6$ alkylthio); arylthio; azido; nitro; O-carbamyl; N-carbamyl; O-thiocarbamyl; N-thiocarbamyl; C-amido; N-amido; S-sulfonamido; N-sulfonamido; C-carboxy; protected C-carboxy; O-carboxy; acyl; cyanate; isocyanato; thiocyanato; isothiocyanato; silyl; sulfenyl; sulfinyl; sulfonyl; trihalomethanesulfonyl; trihalomethanesulfonamido; amino (including protected derivatives thereof); mono-substituted amino (for example, NH($C_1$-$C_6$ alkyl); di-substituted amino (for example, N($C_1$-$C_6$ alkyl)$_2$); oxo (=O); and thioxo (=S).

As used herein, "$C_a$ to $C_b$" in which "a" and "b" are integers refer to the number of carbon atoms in an alkyl group, or the number of ring atoms of a cycloalkyl, aryl, heteroaryl or heterocyclyl group. That is, the alkyl, ring of the cycloalkyl, and ring of the aryl, can contain from "a" to "b", inclusive, carbon atoms. Likewise, the ring of the heteroaryl and ring of the heterocyclyl can contain from "a" to "b", inclusive, total ring atoms. Thus, for example, a "$C_1$ to $C_4$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—; a $C_3$ to $C_4$ cycloalkyl group refers to all cycloalkyl groups having from 3 to 4 carbon atoms, that is, cyclopropyl and cyclobutyl. Similarly, a "4 to 6 membered heterocyclyl" group refers to all heterocyclyl groups with 4 to 6 total ring atoms, for example, azetidine, oxetane, oxazoline, pyrrolidine, piperidine, piperazine, morpholine, and the like. If no "a" and "b" are designated with regard to an alkyl, cycloalkyl, aryl, heteroaryl or heterocyclyl group, the broadest range described in these definitions is to be assumed. As used herein, the term "$C_1$-$C_6$" includes $C_1$, $C_2$, $C_3$, $C_4$, $C_5$ and $C_6$, and a range defined by any of the two numbers. For example, $C_1$-$C_6$ alkyl includes $C_1$, $C_2$, $C_3$, $C_4$, $C_5$ and $C_6$ alkyl, $C_2$-$C_6$ alkyl, $C_1$-$C_3$ alkyl, etc. Similarly, $C_3$-$C_8$ carbocyclyl or cycloalkyl each includes hydrocarbon ring containing 3, 4, 5, 6, 7 and 8 carbon atoms, or a range defined by any of the two numbers, such as $C_3$-$C_7$ cycloalkyl or $C_5$-$C_6$ cycloalkyl.

As used herein, "alkyl" refers to a straight or branched hydrocarbon chain that comprises a fully saturated (no double or triple bonds) hydrocarbon group. The alkyl group may have 1 to 20 carbon atoms (whenever it appears herein, a numerical range such as "1 to 20" refers to each integer in the given range; e.g., "1 to 20 carbon atoms" means that the alkyl group may consist of 1 carbon atom, 2 carbon atoms, 3 carbon atoms, etc., up to and including 20 carbon atoms, although the present definition also covers the occurrence of the term "alkyl" where no numerical range is designated). The alkyl group may also be a medium size alkyl having 1 to 10 carbon atoms. The alkyl group could also be a lower alkyl having 1 to 6 carbon atoms. The alkyl group of the compounds may be designated as "$C_1$-$C_4$ alkyl" or similar designations. By way of example only, "$C_1$-$C_4$ alkyl" indicates that there are one to four carbon atoms in the alkyl chain, i.e., the alkyl chain is selected from methyl, ethyl, propyl, iso-propyl, n-butyl, iso-butyl, sec-butyl, and t-butyl. Typical alkyl groups include, but are in no way limited to, methyl, ethyl, n-propyl, isopropyl, butyl, isobutyl, tertiary butyl, pentyl (straight chain or branched), and hexyl (straight chain or branched). The alkyl group may be substituted or unsubstituted.

As used herein, "alkoxy" refers to the formula —OR wherein R is an alkyl group, as defined herein. A non-limiting list of alkoxy group includes methoxy, ethoxy, n-propoxy, 1-methylethoxy (isopropoxy), n-butoxy, iso-butoxy, sec-butoxy, and tert-butoxy. An alkoxy may be substituted or unsubstituted.

As used herein, "alkoxyalkyl" or "(alkoxy)alkyl" refers to an alkoxy group connected via an alkylene group, such as $C_2$-$C_8$ alkoxyalkyl, or ($C_1$-$C_6$ alkoxy)$C_1$-$C_6$ alkyl, for example, $—(CH_2)_{1-3}—OCH_3$.

The present disclosure describes biobased cleansing compositions, including for example, high biobased cleansing compositions and high biobased detergent sheets. In certain embodiments, the disclosed biobased cleansing products are liquidless, water-dissolvable cleansing products. Liquidless, water-dissolvable cleansing products can include detergent sheets, including laundry detergent sheets, and other detergent compositions in which the detergent components are suspended in a substantially liquidless matrix, preferably a biobased or high biobased substantially liquidless matrix. In some embodiments, the liquidless matrix is substantially free of fossil-fuel based carbon. In some preferred embodiments, the liquidless matrix contains no more than a negligible amount of fossil-fuel based carbon. In some preferred embodiments, the liquidless matrix contains no measurable amount of fossil-fuel based carbon. In some embodiments, the liquidless matrix is substantially free of polyvinyl alcohol (PVA). In some preferred embodiments, the liquidless matrix contains no more than a negligible amount of PVA. In some preferred embodiments, the liquidless matrix contains no measurable amount of PVA.

In some embodiments, the cleansing composition is substantially free of fossil-fuel based carbon. In some preferred embodiments, the cleansing composition contains no more than a negligible amount of, fossil-fuel based carbon. In some preferred embodiments, the cleansing composition contains no measurable amount of fossil-fuel based carbon. In some embodiments, the cleansing composition is substantially free of polyvinyl alcohol (PVA). In some preferred embodiments, the cleansing composition contains no more than a negligible amount of PVA. In some preferred embodiments, the cleansing composition contains no measurable amount of PVA.

In some embodiments, the cleansing composition is formulated to form a liquidless matrix that does not use PVA as a binder. The present disclosure also describes a high biobased content, compact laundry detergent sheet that is substantially free of, and preferably contains negligible to no measurable amount of, fossil-fuel based carbon. The present disclosure also describes a high biobased content, compact laundry detergent sheet that is substantially free of, and preferably contains negligible to no measurable, PVA. In some embodiments, the laundry detergent sheet comprises a high biobased content water-soluble matrix formed by one or more plant-based binders such that the percentage of plant-based carbon in the matrix is between 80% to 99%, or preferably between 80% to 90%. In some embodiments, the matrix of the laundry detergent sheet is configured to suspend and bind the detergent components when not in contact with water.

Some embodiments of the present disclosure relate to a cleansing composition comprising a water-soluble matrix. In some embodiments, the water-soluble matrix can be a biopolymer, for example, a polysaccharide with linked sugar monomeric units. In some embodiments, the biopolymer can provide certain functions that would be served by PVA in a PVA-containing cleansing composition. In further embodiments, the biopolymer can serve as a replacement to synthetic binders, such as PVA.

In some embodiments, the water-soluble matrix can comprise a compound of Formula (I):

(I)

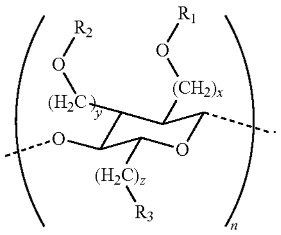

In some embodiments, $R_1$ and $R_2$ are each independently an optionally substituted $C_{1-12}$ alkyl or H. In some embodiments, $R_3$ is an optionally substituted $C_{1-12}$ alkyl, H, —OH, or $—OR_a$. In some embodiments, $R_a$, is an optionally substituted $C_{1-12}$ alkyl. In some embodiments, each of x, y, and z is independently 0, 1, 2, 3, 4, 5 or 6. In some embodiments, n is an integer from 1 to about 10,000.

In some embodiments, $R_1$ and $R_2$ are each H. In some embodiments, $R_1$ and $R_2$ are each an optionally substituted $C_{1-12}$ alkyl. For example, in some embodiments, $R_1$ and $R_2$ are ($—CH_2CH_3$) or ($—CH_2CH_2OH$). In some embodiments, $R_1$ is H, and $R_2$ is an optionally substituted $C_{1-12}$ alkyl. In some embodiments, $R_1$ is an optionally substituted $C_{1-12}$ alkyl, and $R_2$ is H. In some embodiments, x and y are each 0.

In some embodiments, $R_3$ is an optionally substituted $C_{1-12}$ alkyl. In some embodiments, $R_3$ is H. In some embodiments, $R_3$ is —OH. In some embodiments, $R_3$ is $—OR_a$. In further embodiments, $R_a$, is an optionally substituted $C_{1-12}$ alkyl. For example, in some embodiments, $R_a$ is ($—CH_2CH_3$) or ($—CH_2CH_2OH$). In some embodiments, z is 0. In some embodiments, z is 1.

In some embodiments, the compound of Formula (I) is selected from the group consisting of

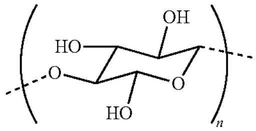
,
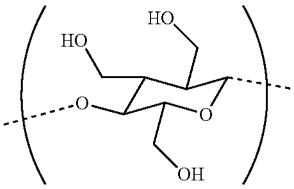
,
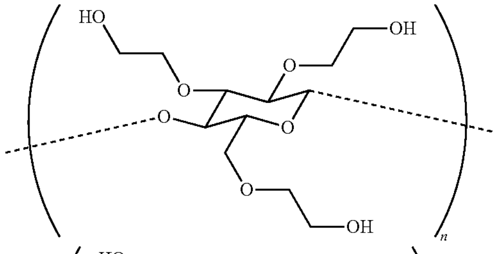
,
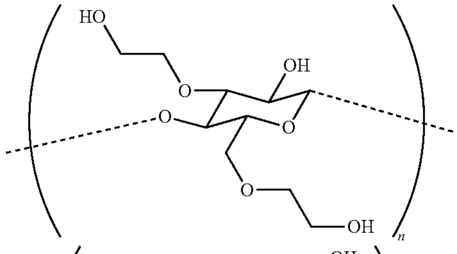
,
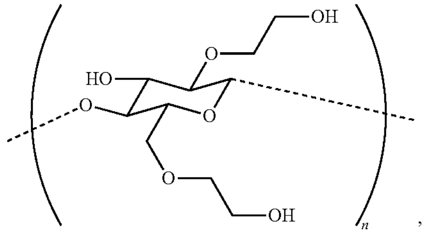
,
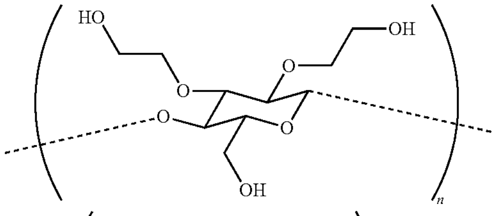

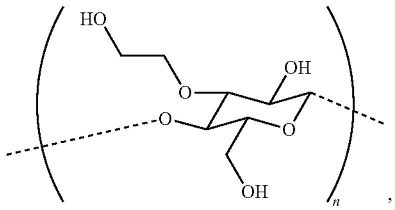
, and
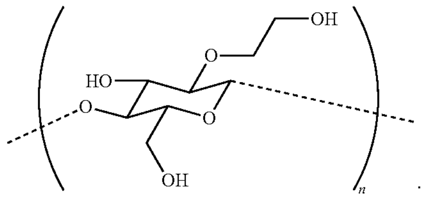
.

As used herein the phrase "substantially free of" a particular ingredient (or potential ingredient or class of ingredients or class of potential ingredients) refers to including less than approximately 10 weight percent of the stated ingredient. In some embodiments, a composition or component of a composition will be considered "substantially free of" particular ingredient (or potential ingredient or class of ingredients or class of potential ingredients) where less than approximately 7.5 weight percent, approximately 5 weight percent, approximately 2.5 weight percent, approximately 2 weight percent, approximately 1.5 weight percent, approximately 1 percent, approximately 0.5 weight percent, or approximately 0.25 weight percent of the stated ingredient.

As used here, the phrase "contains negligible amounts of" a particular ingredient (or potential ingredient or class of ingredients or class of potential ingredients) refers to the ability to identify the present of no more than trace amount of the ingredient using standard analytical techniques. Trace amounts may be an amount no greater than 0.25 weight percent, and include amounts no greater than 0.2 weight percent, 0.1 weight percent, 0.05 weight percent, 0.01 weight percent, 0.005 weight percent, or 0.001 weight percent.

As used here, the phrase "contains no measurable amounts of" a particular ingredient (or potential ingredient or class of ingredients or class of potential ingredients) refers to the inability to identify the presence of a quantifiable amount of the ingredient using standard analytical techniques.

Detergent Components of Cleansing Composition

As used herein the phrase "detergent component" refers to a constituent component of a cleansing composition that serves, in isolation or in combination with other components, to clean soiled material. Cleansing compositions include, but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, dish washing compositions, hard surface cleaning compositions, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or the laundering treatment.

FIG. 1 is a schematic depiction of a solid detergent sheet 100 in accordance with certain embodiments of the present disclosure. As shown in FIG. 1, the solid detergent sheet 100 may comprise an upper surface 102, a lower surface 104, and a water-soluble matrix 106 that is substantially free of polyvinyl alcohol. In one embodiment, the water-soluble matrix 106 is formed of a heterogeneous polymer comprising $C_5$ and $C_6$ monosaccharide units. Examples of $C_5$ monosaccharides include D-xylose or L-arabinose. Examples of $C_6$ monosaccharides include D-galactose, D-glucose, D-fructose, L-rhamnose and D-mannose. In one embodiment, monosaccharide units in the matrix are bonded together to form polysaccharides such as xylan, arabinan, galactan, glucan and mannan. In another embodiment, the water-soluble matrix 106 comprises a biobased binder such as hydroxyethyl cellulose, gum acacia, cellulose, *Zea mays* starch, *Oryza sativa* starch, sodium polyitaconate, hydroxypropyl cellulose, tapioca starch, and poly(2-ethyl-2-oxazoline), or combinations thereof.

As shown in FIG. 1, the solid detergent sheet may further comprise detergent components 108 that are supported by and bound to the water-soluble matrix 106 such that detergent components 108 that are on or near the upper surface 102 and the lower surface 104 remain bound to the matrix 106. The detergent components 108 can include ionic and anionic surfactants, enzymes and fatty acids. In one embodiment, the detergent components 108 are distributed throughout the water-soluble matrix 106 formed of a heterogeneous polymer. In another embodiment, the detergent components 108 are concentrated in certain regions of the water-soluble matrix. The detergent components are released as proximal portions of the heterogenous polymer matrix dissolve in water.

In some embodiments, the disclosure relates to a cleansing composition for laundering fabrics that comprises renewable components and exhibits good performance, such as stain removal and whiteness maintenance. The detergent components disclosed herein may contain from about 70% or to about 80% or to about 90%, or to about 95% or to about 100% by weight of renewable components. The following classes of compounds are among the contemplated detergent components.

Alkyl Ether Sulfate

The detergent component described herein may comprise from about 1% to about 20%, or from about 1% to about 15%, or from about 2% to about 10% by weight, of one or more alkyl ether sulfates (also known as alcohol ether sulfate) derived from renewable fatty alcohol. One or more alkyl ether sulfates of the formula $R^1—(OCH_2CH_2)_x—O—SO_3M$, where $R^1$ is a non-petroleum derived, linear or branched fatty alcohol consisting of even numbered carbon chain lengths of from about $C_8$ to about $C_{20}$, or from about $C_8$ to about $C_{16}$, or from about $C_{10}$ to about $C_{14}$, or about $C_{12}$, and where x is from about 0.5 to about 8, or x is from about 0.5 to about 5, or x is from about 0.5 to about 3, and where M is an alkali metal, ammonium, alkyl ammonium, or alkanol ammonium cation. M may be an alkali metal or ammonium cation.

The fatty alcohol portion of the alkyl ether sulfate ($R^1$) may be derived from a renewable source (e.g., animal or plant derived) rather than geologically derived (e.g., petroleum derived). Fatty alcohols derived from a renewable source may be referred to as natural fatty alcohols. Natural fatty alcohols have an even number of carbon atoms with a single alcohol (—OH) attached to the terminal carbon. The fatty alcohol portion of the surfactant ($R^1$) may comprise distributions of even number carbon chains, e.g., C12, C14, C16, C18, and so forth.

The fatty alcohol portion of the alkyl ether sulfate ($R^1$) may be derived from a natural oil. The natural oil may be selected from, for example, coconut oil, palm kernel oil, palm oil, or a mixture thereof.

The alkyl ether sulfates described herein are typically not single compounds as suggested by the formula $R^1—(OCH_2CH_2)_x—O—SO_3M$, but rather, alkyl ether sulfates comprise a mixture of several homologs having varied polyalkylene oxide chain length and molecular weight. For example, ethoxylated alcohol sulfate derived from conventional potassium hydroxide-catalyzed ethoxylation of the alcohol with 1, 2, and 3 moles of ethylene oxide, respectively, is not a single compound containing 1, 2, or 3 ($CH_2CH_2O$) units as the formula may suggest. Instead, the ethoxylated alcohol sulfate is a mixture of several homologs whose total ethylene oxide units vary from 0 to 10. It is understood, therefore, that ethoxylated alcohol sulfate may comprise some non-ethoxylated (unreacted) alkyl sulfate.

The detergent component may comprise one or more than one type of alkyl ether sulfate; the different types of alkyl ether sulfate may differ in carbon chain length and/or degree of ethoxylation. The compositions disclosed herein may comprise a mixture of alkyl ether sulfates.

Alkyl ether sulfates are generally available as salts e.g., sodium alkyl ether sulfates. Commercially available alkyl ether sulfates include the CALFOAM® alcohol ether sulfates from Pilot Chemical, the EMAL®, LEVENOL® and LATEMAL® products from Kao Corporation, and the POLYSTEP® products from Stepan, most of these with fairly low EO content (e.g., average 3 or 4-EO). Alkyl ether sulfates may be prepared by sulfonation of alcohol ethoxylates (i.e., nonionic surfactants), for example, when the commercial alkyl ether sulfate having the desired chain length and EO content is not easily found, but the alcohol ethoxylate is available.

Fatty Alcohol Ethoxylate

The detergent component may comprise from about 1% to about 15%, or from about 1% to about 12%, or from about 2% to about 10% by weight, of one or more fatty alcohol ethoxylates derived from renewable fatty alcohol.

The detergent component described herein may comprise one or more fatty alcohol ethoxylates of formula $R^2—(OCH_2CH_2)_y—OH$, where $R^2$ is a non-petroleum derived, linear or branched fatty alcohol consisting of even numbered carbon chain lengths of from about $C_{10}$ to about $C_{18}$, or from about $C_{12}$ to about $C_{16}$, or from about $C_{12}$ to about $C_{14}$, or about $C_{16}$, and where y is from about 0.5 to about 15, or from about 2 to about 12, or from about 3 to about 10.

The fatty alcohol ethoxylates are typically not single compounds as suggested by the formula $R^2—(OCH_2CH_2)_y—OH$, but rather, fatty alcohol ethoxylates comprise a mixture of several homologs having varied polyalkylene oxide chain length and molecular weight. For example, fatty alcohol ethoxylate derived from conventional potassium hydroxide-catalyzed ethoxylation of the alcohol with 1, 2, and 3 moles of ethylene oxide, respectively, is not a single compound containing 1, 2, or 3 ($CH_2CH_2O$) units as the formula may suggest. Instead, the fatty alcohol ethoxylate is a mixture of several homologs whose total ethylene oxide units vary from 0 to 10. It is understood, therefore, that fatty alcohol ethoxylate may comprise some non-ethoxylated (unreacted) fatty alcohol.

The detergent component may comprise one or more than one type of fatty alcohol ethoxylate; the different types of fatty alcohol ethoxylates may differ in carbon chain length and/or degree of ethoxylation. The compositions disclosed herein may comprise a mixture of fatty alcohol ethoxylates, where the mixture may have an average (arithmetic mean) carbon chain length within the range of about 12 to about 16 carbon atoms, or an average carbon chain length of about 12 carbon atoms, and an average (arithmetic mean) degree of ethoxylation of from about 1 mol to about 15 mols of ethylene oxide, or from about 3 mol to about 10 mols of ethylene oxide.

Amine Oxide

The detergent component may comprise from about 0.1% to about 5%, or from about 1% to about 4%, or from about 2% to about 3% by weight of one or more amine oxide surfactants.

Amine oxides are materials that are often referred to in the art as "semi-polar" nonionics. Amine oxides have the formula: $R^3N(O)(CH_3)_2$. In this formula, $R^3$ is saturated or unsaturated, linear or branched, and may contain from about 8 to about 20, or from 10 to about 16 carbon atoms, or $R^3$ is a $C_{12}$-$C_{16}$ primary alkyl. The detergent compositions described herein may comprise $C_{12}$-$C_{14}$ dimethyl amine oxide. $C_{12}$-$C_{14}$ dimethyl amine oxide is supplied by Procter & Gamble Chemicals, Cincinnati, USA. Amine oxide may be derived from renewable sources, such as natural fatty alcohols. Amine oxide is believed to work synergistically with anionic surfactants to remove stains.

Cleaning Polymer

The detergent component described herein may comprise from about 0.1% to about 5%, or from about 1% to about 4%, or from about 1% to about 3% by weight.

The detergent component may comprise one or more cleaning polymers. Examples are carboxymethylcellulose, poly(vinyl-pyrrolidone), poly (ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid copolymers. The detergent component may comprise one or more amphiphilic cleaning polymers, such as the compound having the following general structure: bis(($C_2H_5O$)($C_2H_4O$)n)($CH_3$)—$N^+$—$C_xH_{2x}$—$N^+$—($CH_3$)-bis(($C_2H_5O$)($C_2H_4O$)n), wherein n=from 20 to 30, and x=from 3 to 8, or sulphated or sulphonated variants thereof. The detergent component may comprise one or more alkoxylated polyalkylenimines or one or more alkoxylated polyamines. The detergent component may comprise amphiphilic alkoxylated grease cleaning polymers which have balanced hydrophilic and hydrophobic properties, such that they remove grease particles from fabrics and surfaces. The amphiphilic alkoxylated grease cleaning polymers may comprise a core structure and a plurality of alkoxylate groups attached to that core structure. These may comprise alkoxylated polyalkylenimines, for example, having an inner polyethylene oxide block and an outer polypropylene oxide block. Such compounds may include, but are not limited to, ethoxylated polyethyleneimine, ethoxylated hexamethylene diamine, and sulfated versions thereof. Polypropoxylated derivatives may also be included. A wide variety of amines and polyalklyeneimines can be alkoxylated to various degrees. A useful example is 600 g/mol polyethyleneimine core ethoxylated to 20 EO groups per NH and is available from BASF.

The detergent component described herein may comprise alkoxylated polycarboxylates. Alkoxylated polycarboxylates such as those prepared from polyacrylates may be useful herein to provide additional grease removal performance. Chemically, these materials comprise polyacrylates having one ethoxy side-chain per every 7-8 acrylate units. The side-chains are of the formula —$(CH_2CH_2O)_m(CH_2)_nCH_3$ where m is 2-3 and n is 6-12. The side-chains are ester-linked to the polyacrylate backbone to provide a comb polymer type structure. The molecular weight can vary, but is typically in the range of about 2000 to about 50,000.

The detergent component may comprise amphilic graft co-polymers. Suitable amphilic graft co-polymer include an amphilic graft co-polymer comprising (i) a polyethyelene glycol backbone; and (ii) and at least one pendant moiety selected from polyvinyl acetate, polyvinyl alcohol, and mixtures thereof. A commercially available example of an amphilic graft co-polymer is Sokalan® HP22, supplied from BASF. Suitable polymers include random graft copolymers, for example, a polyvinyl acetate grafted polyethylene oxide copolymer having a polyethylene oxide backbone and multiple polyvinyl acetate side chains.

The detergent component may contain one or more carboxylate polymers, such as a maleate/acrylate random copolymer or polyacrylate homopolymer. The carboxylate polymer may be a polyacrylate homopolymer having a molecular weight of from 4,000 Da to 9,000 Da, or from 6,000 Da to 9,000 Da.

The detergent component may contain one or more soil release polymers. Suitable soil release polymers include polyester soil release polymers such as Repel-o-tex polymers, including Repel-o-Tex® SF, SF-2 and SRP6 supplied by Rhodia. Other suitable soil release polymers include Texcare® polymers, including Texcare® SRA100, SRA300, SRN100, SRN170, SRN240, SRN300 and SRN325 supplied by Clariant. Other suitable soil release polymers are Marloquest® polymers, such as Marloquest® SL supplied by Sasol.

The detergent component may contain one or more cellulosic polymers. Suitable cellulosic polymers include alkyl cellulose, alkyl alkoxyalkyl cellulose, carboxyalkyl cellulose, alkyl carboxyalkyl cellulose. The cellulosic polymer(s) may be selected from the group consisting of carboxymethyl cellulose, methyl cellulose, methyl hydroxyethyl cellulose, methyl carboxymethyl cellulose, and mixtures thereof. The carboxymethyl cellulose may have a degree of carboxymethyl substitution from about 0.5 to about 0.9 and a molecular weight of from about 100,000 Da to about 300,000 Da.

Polyhydric Alcohol

The detergent component may comprise from about 0.01% to about 0.1% by weight of polyhydric alcohol. The detergent compositions described herein may comprise a polyhydric alcohol selected from the group consisting of 2,3-butanediol, 2,3-pentanediol, 2,4-pentanediol, 1,2-butanediol, 2,3-hexandiol, 1,5-pentanediol, and mixtures thereof. The detergent compositions described herein may comprise from about 0.01% to about 0.1% of 2,3-hexandiol.

Ethanolamine

Ethanolamines, such as monoethanolamine, diethanolamine and triethanolamine, may be used as detergent components. In particular, the use of monoethanolamine as a chlorine scavenger is known to reduce the level of free chlorine in the wash solution and correspondingly reduce the fading associated with colored fabrics. The compositions disclosed herein may be substantially free of ethanolamines, yet still provide effective chlorine scavenging and reduction in fading of colored fabrics. The compositions disclosed herein may be substantially free of monoethanolamine.

Other Surfactants and Adjuncts

The detergent component may comprise additional surfactants and/or adjunct ingredients.

Other Surfactants

In addition to the alkyl ether sulfate, the fatty alcohol ethoxylate, and the amine oxide, the detergent component disclosed herein may comprise an additional surfactant, e.g., a fourth surfactant, a fifth surfactant. The detergent component may comprise from about 1% to about 75%, or from about 2% to about 35%, or from about 5% to about 10%, by weight of the composition, of an additional surfactant, e.g., a fourth surfactant, a fifth surfactant. The additional surfactant(s) may be selected from the group consisting of anionic surfactants, nonionic surfactants, cationic surfactants, zwitterionic surfactants, amphoteric surfactants, ampholytic surfactants, and mixtures thereof.

Anionic Surfactants

The additional surfactant(s) may comprise one or more additional anionic surfactants. The additional anionic surfactant may be a renewable surfactant. Suitable additional anionic surfactants include petroleum-derived alkoxylated alkyl sulfates (e.g., petroleum-derived ethoxylated alkyl sulfate surfactants), non-alkoxylated alkyl sulfates, and sulfonic detersive surfactants, e.g., alkyl benzene sulfonates.

Non-Alkoxylated Alkyl Sulfates

Non-alkoxylated alkyl sulfates may also be a detergent component. Examples of non-alkoxylated, e.g., non-ethoxylated, alkyl sulfate surfactants include those produced by the sulfation of higher $C_5$-$C_{20}$ synthetic alcohols. In some examples, primary alkyl sulfate surfactants have the general formula: $ROSO_3^-M^+$, wherein R is a $C_8$-$C_{20}$ hydrocarbyl group, which may be straight or branched, and M is a water-solubilizing cation. In some examples, R is a $C_{10}$-$C_{15}$ alkyl, and M is an alkali metal.

Other useful anionic surfactants include the alkali metal salts of alkyl benzene sulfonates, in which the alkyl group contains from about 9 to about 15 carbon atoms, in straight chain (linear) or branched chain configuration. In some examples, the alkyl group is linear. Such linear alkylbenzene sulfonates are known as "LAS." In other examples, the linear alkylbenzene sulfonate may have an average number of carbon atoms in the alkyl group of from about 11 to 14. In a specific example, the linear straight chain alkyl benzene sulfonates may have an average number of carbon atoms in the alkyl group of about 11.8 carbon atoms, which may be abbreviated as C11.8 LAS. LAS may be derived from natural materials, including bioparaffin, natural alcohols and esters.

Suitable alkyl benzene sulfonate (LAS) may be obtained, by sulfonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulfonate that is obtained by DETAL catalyzed process, although other synthesis routes, such as HF, may also be suitable. In one aspect a magnesium salt of LAS is used.

Suitable anionic surfactants also include anionic branched surfactants selected from branched sulphate or branched sulphonate surfactants, e.g., branched alkyl sulphate, branched alkyl alkoxylated sulphate, and branched alkyl benzene sulphonates, comprising one or more random alkyl branches, e.g., $C_{14}$ alkyl groups, typically methyl and/or ethyl groups. The branched detersive surfactant may be a mid-chain branched detersive surfactant, e.g., a mid-chain branched anionic detersive surfactant, such as a mid-chain branched alkyl sulphate and/or a mid-chain branched alkyl benzene sulphonate. The branched anionic surfactant may comprise a branched modified alkylbenzene sulfonate (MLAS). The branched anionic surfactant may comprise a $C_{12/13}$ alcohol-based surfactant comprising a methyl branch randomly distributed along the hydrophobe chain, e.g., Safol®, Marlipal® available from Sasol. Further suitable branched anionic detersive surfactants include those derived from anteiso and iso-alcohols.

Other anionic surfactants useful herein are the water-soluble salts of: paraffin sulfonates and secondary alkane sulfonates containing from about 8 to about 24 (and in some examples about 12 to 18) carbon atoms. Mixtures of the alkylbenzene sulfonates with the above-described paraffin sulfonates, secondary alkane sulfonates and alkyl glyceryl ether sulfonates are also useful.

Suitable additional, renewable, anionic surfactants include anionic surfactants derived from renewable isoprenoid-based polybranched detergent alcohols, renewable alkyl benzene sulfonate, renewable alcohol sulfate, and renewable paraffin sulfonate as described in US Patent Application No. 2015-0240187 A1, which is herein incorporated by reference, methyl ester sulfonates, alkyl glyceryl ether sulfonates, especially those ethers of $C_{8-18}$ alcohols (e.g., those derived from tallow and coconut oil), and alkyl ether carboxylates derived from (natural) fatty alcohols. Isoprenoid-based surfactants and isoprenoid derivatives (e.g., farnesene-based surfactants) are known; farnesene is available from Amyris.

The anionic surfactants may exist in an acid form, and the acid form may be neutralized to form a surfactant salt. Typical agents for neutralization include metal counterion bases, such as hydroxides, e.g., NaOH or KOH. Further suitable agents for neutralizing anionic surfactants in their acid forms include ammonia, amines, or alkanolamines. Non-limiting examples of alkanolamines include monoethanolamine, diethanolamine, triethanolamine, and other linear or branched alkanolamines known in the art. Amine neutralization may be done to a full or partial extent, e.g., part of the anionic surfactant mix may be neutralized with sodium or potassium and part of the anionic surfactant mix may be neutralized with amines or alkanolamines.

Nonionic Surfactant

The additional surfactant(s) may comprise one or more additional nonionic surfactants. The detergent composition may comprise from about 0.1% to about 40%, by weight of the composition, of one or more additional nonionic surfactants. The detergent composition may comprise from about 0.1% to about 15%, by weight of the composition, of one or more additional nonionic surfactants. The detergent composition may comprise from about 0.3% to about 10%, by weight of the composition, of one or more additional nonionic surfactants.

The additional nonionic surfactant may be a renewable surfactant. Suitable nonionic surfactants include $C_8$-$C_{18}$ alkyl ethoxylates, such as, NEODOL® nonionic surfactants from Shell; $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols, BA; $C_{14}$-$C_{22}$ mid-chain branched alkyl alkoxylates, BAEX, wherein x is from 1 to 30; and ether capped poly(oxyalkylated) alcohol surfactants.

Suitable renewable nonionic detersive surfactants include alkylpolysaccharides, such as alkylpolyglycosides, and methyl ester ethoxylates.

Cationic Surfactants

The additional surfactant(s) may comprise one or more one or more cationic surfactants. The detergent component may comprise from about 0.1% to about 10%, or about 0.1% to about 7%, or about 0.3% to about 5% by weight of the composition, of one or more cationic surfactants. The detergent compositions of the invention may be substantially free of cationic surfactants and surfactants that become cationic below a pH of 7 or below a pH of 6.

Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, e.g., amido propyldimethyl amine (APA).

Suitable cationic detersive surfactants also include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds $C_8$-10 alkyl mono-hydroxyethyl di-methyl quaternary ammonium chloride, mono-$C_{10}$-12 alkyl mono-hydroxyethyl di-methyl quaternary ammonium chloride and mono-$C_{10}$ alkyl mono-hydroxyethyl di-methyl quaternary ammonium chloride.

Zwitterionic Surfactants

Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. Suitable examples of zwitterionic surfactants include betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N,N-dimethylammino-1-propane sulfonate where the alkyl group can be $C_8$ to $C_{18}$.

Amphoteric Surfactants

Examples of amphoteric surfactants include aliphatic derivatives of secondary or tertiary amines, or aliphatic derivatives of heterocyclic secondary and tertiary amines in which the aliphatic radical may be straight or branched-chain and where one of the aliphatic substituents contains at least about 8 carbon atoms, or from about 8 to about 18 carbon atoms, and at least one of the aliphatic substituents contains an anionic water-solubilizing group, e.g. carboxy, sulfonate, sulfate. Examples of compounds falling within this definition are sodium 3-(dodecylamino)propionate, sodium 3-(dodecylamino) propane-1-sulfonate, sodium 2-(dodecylamino)ethyl sulfate, sodium 2-(dimethylamino) octadecanoate, disodium 3-(N-carboxymethyldodecylamino)propane 1-sulfonate, disodium octadecyl-imminodiacetate, sodium 1-carboxymethyl-2-undecylimidazole, and sodium N,N-bis (2-hydroxyethyl)-2-sulfato-3-dodecoxypropylamine. Suitable amphoteric surfactants also include sarcosinates, glycinates, taurinates, and mixtures thereof.

Suitable branched anionic surfactants also include Guerbet-alcohol-based surfactants. Guerbet alcohols are branched, primary monofunctional alcohols that have two linear carbon chains with the branch point always at the second carbon position. Guerbet alcohols are chemically described as 2-alkyl-1-alkanols. Guerbet alcohols generally have from 12 carbon atoms to 36 carbon atoms. The Guerbet alcohols may be represented by the following formula: $(R1)(R2)CHCH_2OH$, where R1 is a linear alkyl group, R2 is a linear alkyl group, the sum of the carbon atoms in R1 and R2 is 10 to 34, and both R1 and R2 are present. Guerbet alcohols are commercially available from Sasol as Isofol® alcohols and from Cognis as Guerbetol.

Adjuncts

Suitable adjunct ingredients also include builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, dye transfer inhibiting agents, chelating agents, suds supressors, softeners, and perfumes.

Enzymes

The compositions described herein may comprise one or more enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, B-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in a detergent composition, the aforementioned additional enzymes may be present at levels from about 0.00001% to about 2%, from about 0.0001% to about 1% or even from about 0.001% to about 0.5% enzyme protein by weight of the composition.

Enzyme Stabilizing System

The compositions may optionally comprise from about 0.001% to about 10%, or from about 0.005% to about 8%, or from about 0.01% to about 6%, by weight of the composition, of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, chlorine bleach scavengers and mixtures thereof, and are designed to address different stabilization problems depending on the type and physical form of the detergent composition. In the case of aqueous detergent compositions comprising protease, a reversible protease inhibitor, such as a boron compound, including borate, 4-formyl phenylboronic acid, phenylboronic acid and derivatives thereof, or compounds such as calcium formate, sodium formate and 1,2-propane diol may be added to further improve stability.

Amines

Amines may be used in the compositions described herein for added removal of grease and particulates from soiled materials. The compositions described herein may comprise from about 0.1% to about 10%, in some examples, from about 0.1% to about 4%, and in other examples, from about 0.1% to about 2%, by weight of the detergent composition, of additional amines. Non-limiting examples of additional amines may include, but are not limited to, polyetheramines, polyamines, oligoamines, triamines, diamines, pentamines, tetraamines, or combinations thereof. Specific examples of suitable additional amines include tetraethylenepentamine, triethylenetetraamine, diethylenetriamine, or a mixture thereof.

Bleaching Agents

The detergent component may comprise one or more bleaching agents. Suitable bleaching agents other than bleaching catalysts include photobleaches, bleach activators, hydrogen peroxide, sources of hydrogen peroxide, preformed peracids and mixtures thereof. In general, when a bleaching agent is used, the detergent compositions of the present invention may comprise from about 0.1% to about 50% or even from about 0.1% to about 25% bleaching agent by weight of the detergent composition.

Bleach Catalysts

The detergent component may also include one or more bleach catalysts capable of accepting an oxygen atom from a peroxyacid and/or salt thereof, and transferring the oxygen atom to an oxidizeable substrate. Suitable bleach catalysts include, but are not limited to: iminium cations and polyions; iminium zwitterions; modified amines; modified amine oxides; N-sulphonyl imines; N-phosphonyl imines; N-acyl imines; thiadiazole dioxides; perfluoroimines; cyclic sugar ketones and mixtures thereof.

Brighteners, Fabric Hueing Agents

Commercial fluorescent brighteners include derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents. The detergent compositions disclosed herein may be substantially free of brighteners (also known as fluorescent brighteners or optical brighteners).

Typically, the hueing agent provides a blue or violet shade to fabric. Hueing agents include the following known chemical classes of dye: acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof. Hueing agents include dyes, dye-clay conjugates, organic and inorganic pigments, small molecule dyes, and polymeric dyes.

Whitening Agents

The detergent component may also include one or more whitening agents capable of eliminating the yellowness exhibited by ageing cellulosic substrates. By utilizing such improved whitening agents, the life of the textile substrates, such as clothing articles, table linens, etc., may be extended. The whitening agents of the present invention may be dyes, pigments, or polymeric colorants comprising a chromophore constituent and a polymeric constituent. The chromophore constituent is characterized in that it emits or absorbs wavelength in the range of blue, red, violet, purple, or combinations thereof upon exposure to light. Preferably, the chromophore constituent exhibits an absorbance spectrum value from about 520 nanometers to about 640 nanometers in water, and more preferably from about 570 nanometers to about 610 nanometers in water. Preferably, the chromophore constituent exhibits an emission spectrum value from about 400 nanometers to about 480 nanometers in water. Suitable whitening agents include, but are not limited to: silicates and carbonates and mixtures thereof.

The whitening agents described in the present specification may be incorporated into a laundry care composition including but not limited to laundry detergents and fabric care compositions. Such compositions comprise one or more of said whitening agents and a laundry care ingredient.

Dye Transfer Inhibiting Agents

Fabric detergent compositions may also include one or more materials effective for inhibiting the transfer of dyes from one fabric to another during the cleaning process. Generally, such dye transfer inhibiting agents may include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents may be used at a concentration of about 0.0001% to about 10%, by weight of the composition, in some examples, from about 0.01% to about 5%, by weight of the composition, and in other examples, from about 0.05% to about 2% by weight of the composition.

Chelating Agents

The detergent compositions described herein may also contain one or more metal ion chelating agents. Suitable molecules include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins and mixtures thereof. Chelating agents can be present in the acid or salt form including alkali metal, ammonium, and substituted ammonium salts thereof, and mixtures thereof. Other suitable chelating agents for use herein are the commercial DEQUEST series, and chelants from Monsanto, Akzo-Nobel, DuPont, Dow, the Trilon® series from BASF and Nalco.

The chelant may be present in the detergent compositions disclosed herein at from about 0.005% to about 15% by weight, about 0.01% to about 5% by weight, about 0.1% to about 3.0% by weight, or from about 0.2% to about 0.7% by weight, or from about 0.3% to about 0.6% by weight of the detergent compositions disclosed herein.

Suds Suppressors

Compounds for reducing or suppressing the formation of suds can be incorporated into the detergent component. Suds suppression can be of particular importance in the so-called "high concentration cleaning process" and in front-loading style washing machines. The detergent compositions herein may comprise from 0.1% to about 10%, by weight of the composition, of suds suppressor.

Examples of suds supressors include monocarboxylic fatty acid and soluble salts therein, high molecular weight hydrocarbons such as paraffin, fatty acid esters (e.g., fatty acid triglycerides), fatty acid esters of monovalent alcohols, aliphatic $C_{18}$-$C_{40}$ ketones (e.g., stearone), N-alkylated amino triazines, waxy hydrocarbons preferably having a melting point below about 100° C., silicone suds suppressors, and secondary alcohols. Additional suitable antifoams are those derived from phenylpropylmethyl substituted polysiloxanes.

The detergent component may comprise a suds suppressor selected from organomodified silicone polymers with aryl or alkylaryl substituents combined with silicone resin and a primary filler, which is modified silica. The detergent compositions may comprise from about 0.001% to about 4.0%, by weight of the composition, of such a suds suppressor, for example a) mixtures of from about 80 to about 92% ethylmethyl, methyl(2-phenylpropyl) siloxane; from about 5 to about 14% MQ resin in octyl stearate; and from about 3 to about 7% modified silica; b) mixtures of from about 78 to about 92% ethylmethyl, methyl(2-phenylpropyl) siloxane; from about 3 to about 10% MQ resin in octyl stearate; from about 4 to about 12% modified silica; or c) mixtures thereof, where the percentages are by weight of the anti-foam.

Suds Boosters

If high sudsing is desired, suds boosters such as the $C_{10}$-$C_{16}$ alkanolamides may be incorporated into the detergent compositions at a concentration ranging from about 1% to about 10% by weight of the detergent composition. Some examples include the $C_{10}$-$C_{14}$ monoethanol and diethanol amides. If desired, water-soluble magnesium and/or calcium salts such as $MgCl_2$, $MgSO_4$, $CaCl_2$), $CaSO_4$, and the like, may be added at levels of about 0.1% to about 2% by weight of the detergent composition, to provide additional suds and to enhance grease removal performance.

Conditioning Agents

The detergent component may include a high melting point fatty compound. The high melting point fatty compound useful herein has a melting point of 25° C. or higher, and is selected from the group consisting of fatty alcohols, fatty acids, fatty alcohol derivatives, fatty acid derivatives, and mixtures thereof. Such compounds of low melting point are not intended to be included in this section. The high melting point fatty compound is included in the composition at a level of from about 0.1% to about 40%, preferably from about 1% to about 30%, more preferably from about 1.5% to about 16% by weight of the composition, from about 1.5% to about 8%. Certain nonionic polymer may serve as a conditioning agent.

Suitable conditioning agents include those conditioning agents characterized generally as silicones (e.g., silicone oils, cationic silicones, silicone gums, high refractive silicones, and silicone resins), organic conditioning oils (e.g., hydrocarbon oils, polyolefins, and fatty esters) or combinations thereof, or those conditioning agents which otherwise form liquid, dispersed particles in the aqueous surfactant matrix herein. The concentration of the silicone conditioning agent typically ranges from about 0.01% to about 10%. Suitable conditioning oils include hydrocarbon oils, polyolefins, and fatty esters.

Fabric Enhancement Polymers

Suitable fabric enhancement polymers are typically cationically charged and/or have a high molecular weight. Suitable concentrations of this component are in the range from 0.01% to 50%, preferably from 0.1% to 15%, more preferably from 0.2% to 5.0%, and most preferably from 0.5% to 3.0% by weight of the composition. The fabric enhancement polymers may be a homopolymer or be formed from two or more types of monomers. The monomer weight of the polymer will generally be between 5,000 and 10,000,000, typically at least 10,000 and preferably in the range 100,000 to 2,000,000. Preferred fabric enhancement polymers will have cationic charge densities of at least 0.2 meq/gm, preferably at least 0.25 meq/gm, more preferably at least 0.3 meq/gm, but also preferably less than 5 meq/gm, more preferably less than 3 meq/gm, and most preferably less than 2 meq/gm at the pH of intended use of the composition, which pH will generally range from pH 3 to pH 9, preferably between pH 4 and pH 8. The fabric enhancement polymers may be of natural or synthetic origin.

pH Adjusters

The detergent compositions described herein may include one or more pH adjusters. The detergent compositions may be formulated such that, during use in aqueous cleaning operations, the wash water will have a pH of between about 7.0 and about 12, and in some examples, between about 7.0 and about 11. Techniques for controlling pH at recommended usage levels include the use of buffers, alkalis, or acids, and are well known to those skilled in the art. These include, but are not limited to, the use of sodium carbonate, citric acid or sodium citrate, lactic acid or lactate, monoethanol amine or other amines, boric acid or borates, and other pH-adjusting compounds well known in the art.

Other Ingredients

A wide variety of other ingredients may be used as detergent components, including preservatives, other carriers, hydrotropes, processing aids, solvents for liquid formulations, and solid or other liquid fillers, erythrosine, colliodal silica, waxes, probiotics, surfactin, aminocellulosic polymers, Zinc Ricinoleate, perfume microcapsules, rhamnolipids, sophorolipids, glycopeptides, methyl ester sulfonates, methyl ester ethoxylates, sulfonated estolides, cleavable surfactants, biopolymers, silicones, modified silicones, aminosilicones, deposition aids, locust bean gum, cationic hydroxyethylcellulose polymers, cationic guars, hydrotropes (especially cumenesulfonate salts, toluenesulfonate salts, xylenesulfonate salts, and naphalene salts), antioxidants, BHT, PVA particle-encapsulated dyes or perfumes, pearlescent agents, effervescent agents, color change systems, silicone polyurethanes, opacifiers, tablet disintegrants, biomass fillers, fast-dry silicones, glycol distearate, hydroxyethylcellulose polymers, hydrophobically modified cellulose polymers or hydroxyethylcellulose polymers, starch perfume encapsulates, emulsified oils, bisphenol antioxidants, microfibrous cellulose structurants, properfumes, styrene/acrylate polymers, triazines, soaps, superoxide dismutase, benzophenone protease inhibitors, functionalized $TiO_2$, dibutyl phosphate, silica perfume capsules, and other adjunct ingredients, silicate salts (e.g., sodium silicate, potassium silicate), choline oxidase, pectate lyase, mica, titanium dioxide coated mica, bismuth oxychloride, and other actives.

In some embodiments, the compositions provided herein may further include one or more excipients including, but not limited to, glycerin, xanthan gum, cellulose gum, and sodium benzoate. In some embodiments, the cleansing composition is substantially free of polyvinyl alcohol. In some embodiments, the cleansing composition contains no more than a negligible amount of polyvinyl alcohol. In some embodiments, the cleansing composition contains no measurable amount of polyvinyl alcohol.

Biobased Binders

In some embodiments, a cleansing composition is provided comprising at least one of the following biobased binders, alone or in combination: hydroxyethyl cellulose; gum acacia; cellulose; *Zea mays* starch; *Oryza sativa* starch; sodium polyitaconate; a natural polymer solution; hydroxypropyl cellulose; tapioca starch; and poly(2-ethyl-2-oxazoline).

In some embodiments, the compositions provided herein may further include one or more excipients including, but not limited to, glycerin, xanthan gum, cellulose gum, and sodium benzoate. In some embodiments, the cleansing composition is substantially free of polyvinyl alcohol. In some embodiments, the cleansing composition contains no more than a negligible amount of polyvinyl alcohol. In some embodiments, the cleansing composition contains no measurable amount of polyvinyl alcohol.

In some embodiments, the compositions provided herein include hydroxyethyl cellulose (HEC). HEC is commonly utilized as a hydrophilization agent and serves as a binder in solid detergent sheets compositions. In some embodiments, the amount of HEC in the composition may be, for example, at least about 5 wt. %, at least about 10 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 30 wt. %, at least about 35 wt. %, or within a range defined by any two of the aforementioned concentrations. For example, in some embodiments, the amount of HEC present in the composition will range from, for example, approximately 16 wt. % to approximately 23 wt. %, from approximately 17 wt. % to approximately 22 wt. %, from approximately 18 wt. % to approximately 21 wt. %, or from approximately 19 wt. % to approximately 20 wt. %.

In some embodiments, the compositions provided herein include gum acacia. Gum acacia is a plant-derived fiber and comprises a mixture of glycoproteins and polysaccharides, and may serve as a binder and a component of the matrix in a solid detergent sheets compositions. In some embodiments, the amount of gum acacia in the composition may be, for example, at least about 5 wt. %, at least about 10 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 30 wt. %, at least about 35 wt. %, or within a range defined by any two of the aforementioned concentrations. For example, in some embodiments, the amount of gum acacia present in the composition will range from, for example, approximately 16 wt. % to approximately 23 wt. %, from approximately 17 wt. % to approximately 22 wt. %, from approximately 18 wt. % to approximately 21 wt. %, or from approximately 19 wt. % to approximately 20 wt. %.

In some embodiments, the compositions provided herein include cellulose. Cellulose and may serve as a binder and a component of the matrix in a solid detergent sheets compositions. In some embodiments, the amount of cellulose in the composition may be, for example, at least about 5 wt. %, at least about 10 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 30 wt. %, at least about 35 wt. %, or within a range defined by any two of the aforementioned concentrations. For example, in some embodiments, the amount of cellulose present in the composition will range from, for example, approximately 16 wt. % to approximately 23 wt. %, from approximately 17 wt. % to approximately 22 wt. %, from approximately 18 wt. % to approximately 21 wt. %, or from approximately 19 wt. % to approximately 20 wt. %. In some embodiments, the compositions provided herein may further include one or more excipients including, but not limited to, glycerin, xanthan gum, cellulose gum, and sodium benzoate.

In some embodiments, the compositions provided herein include a starch such as *Zea mays* starch, which may serve as a binder and a component of the matrix in a solid detergent sheets compositions. In some embodiments, the amount of *Zea mays* starch in the composition may be, for example, at least about 5 wt. %, at least about 10 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 30 wt. %, at least about 35 wt. %, or within a range defined by any two of the aforementioned concentrations. For example, in some embodiments, the amount of *Zea mays* starch present in the composition will range from, for example, approximately 16 wt. % to approximately 23 wt. %, from approximately 17 wt. % to approximately 22 wt. %, from approximately 18 wt. % to approximately 21 wt. %, or from approximately 19 wt. % to approximately 20 wt.

In some embodiments, the compositions provided herein include a starch such as *Oryza sativa* starch, which may serve as a binder and a component of the matrix in a solid detergent sheets compositions. In some embodiments, the amount of *Oryza sativa* starch in the composition may be, for example, at least about 5 wt. %, at least about 10 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 30 wt. %, at least about 35 wt. %, or within a range defined by any two of the aforementioned concentrations. For example, in some embodiments, the amount of *Oryza sativa* starch present in the composition will range from, for example, approximately 16 wt. % to approximately 23 wt. %, from approximately 17 wt. % to approximately 22 wt. %, from approximately 18 wt. % to approximately 21 wt. %, or from approximately 19 wt. % to approximately 20 wt. %.

In some embodiments, the compositions provided herein include sodium polyitaconate, which may serve as a binder and a component of the matrix in a solid detergent sheets compositions. Sodium polyitaconate is a polyitaconic acid which is partially neutralized with sodium salt. In some embodiments, the amount of sodium polyitaconate in the composition may be, for example, at least about 5 wt. %, at least about 10 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 30 wt. %, at least about 35 wt. %, or within a range defined by any two of the aforementioned concentrations. For example, in some embodiments, the amount of sodium polyitaconate present in the composition will range from, for example, approximately 16 wt. % to approximately 23 wt. %, from approximately 17 wt. % to approximately 22 wt. %, from approximately 18 wt. % to approximately 21 wt. %, or from approximately 19 wt. % to approximately 20 wt. %.

In some embodiments, the compositions provided herein include a natural polymer solution comprising water, cellulose, glycerin, xanthan gum, cellulose gum, and sodium benzoate. This natural polymer may serve as a binder and a component of the matrix in a solid detergent sheets compositions In some embodiments, the amount of the natural polymer solution in the composition may be, for example, at least about 5 wt. %, at least about 10 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 30 wt. %, at least about 35 wt. %, or within a range defined by any two of the aforementioned concentrations. For example, in some embodiments, the amount of the natural polymer solution present in the composition will range from, for example, approximately 16 wt. % to approximately 23 wt. %, from approximately 17 wt. % to approximately 22 wt. %, from approximately 18 wt. % to approximately 21 wt. %, or from approximately 19 wt. % to approximately 20 wt. %.

In some embodiments, the compositions provided herein include hydroxypropyl cellulose (HPC). HPC is a cellulose ether may serve as a binder and a component of the matrix in a solid detergent sheets compositions. In HPC, hydroxyl groups on the cellulose backbone have been hydroxypropylated. HPC forms liquid crystals and many mesophases according to its concentration in water. Such mesophases include isotropic, anisotropic, nematic and cholesteric. In some embodiments, the amount of HPC in the composition may be, for example, at least about 5 wt. %, at least about 10 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 30 wt. %, at least about 35 wt. %, or within a range defined by any two of the aforementioned concentrations. For example, in some embodiments, the amount of HPC present in the composition will range from, for example, approximately 16 wt. % to approximately 23 wt. %, from approximately 17 wt. % to approximately 22 wt. %, from approximately 18 wt. % to approximately 21 wt. %, or from approximately 19 wt. % to approximately 20 wt. %.

In some embodiments, the compositions provided herein include a starch such as tapioca starch, which may serve as a binder and a component of the matrix in a solid detergent sheets compositions. In some embodiments, the amount of tapioca starch in the composition may be, for example, at least about 5 wt. %, at least about 10 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 30 wt. %, at least about 35 wt. %, or within a range defined by any two of the aforementioned concentrations. For example, in some embodiments, the amount of tapioca starch present in the composition will range from, for example, approximately 16 wt. % to approximately 23 wt. %, from approximately 17 wt. % to approximately 22 wt. %, from approximately 18 wt. % to approximately 21 wt. %, or from approximately 19 wt. % to approximately 20 wt. %.

In some embodiments, the compositions provided herein include poly(2-ethyl-2-oxazoline), which may serve as a binder and a component of the matrix in a solid detergent sheets compositions. Poly(2-ethyl-2-oxazoline) is a non-ionic, water-soluble thermoplastic with optimal shear stability and Newtonian characteristics. In some embodiments, the amount of poly(2-ethyl-2-oxazoline) in the composition may be, for example, at least about 5 wt. %, at least about 10 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 30 wt. %, at least about 35 wt. %, or within a range defined by any two of the aforementioned concentrations. For example, in some embodiments, the amount of poly(2-ethyl-2-oxazoline) present in the composition will range from, for example, approximately 16 wt. % to approximately 23 wt. %, from approximately 17 wt. % to approximately 22 wt. %, from approximately 18 wt. % to approximately 21 wt. %, or from approximately 19 wt. % to approximately 20 wt. %.

Preferred Detergent Components

Coco-Glucoside

In some embodiments, the compositions provided herein include coco-glucoside. Coco-glucoside is an example of a non-ionic surfactant. It may also be used as a co-surfactant, reducing the total active requirements of other foaming ingredients. In some embodiments, the amount of coco-glucoside in the composition may be, for example, at least about 4 wt. %, at least about 5 wt. %, at least about 6 wt. %, at least about 7 wt. %, at least about 8 wt. %, at least about 9 wt. %, at least about 10 wt. %, at least about 11 wt. %, at least about 12 wt. %, at least about 13 wt. %, at least about 14 wt. %, at least about 19 wt. %, at least about 24 wt. %, or within a range defined by any two of the aforementioned concentrations. For example, in some embodiments, the amount of coco-glucoside present in the composition will range from, for example, approximately 5 wt. % to approximately 12 wt. %, from approximately 6 wt. % to approximately 11 wt. %, from approximately 7 wt. % to approximately 10 wt. %, or from approximately 8 wt. % to approximately 9 wt. %.

Coco-Sulfate or its Salts

In some embodiments, the compositions provided herein include coco-sulfate or its salts, preferably the sodium salt. Coco-sulfate is a non-alkoxylated alkyl sulfate. It may also be used as a co-surfactant, reducing the total active requirements of other foaming ingredients. Sodium coco-sulfate is an example of an anionic surfactant. In some embodiments, the amount of coco-sulfate salt in the composition may be, for example, at least about 5 wt. %, at least about 10 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 30 wt. %, at least about 35 wt. %, or within a range defined by any two of the aforementioned concentrations. For example, in some embodiments, the amount of sodium coco-sulfate present in the composition will range from, for example, approximately 16 wt. % to approximately 23 wt. %, from approximately 17 wt. % to approximately 22 wt. %, from approximately 18 wt. % to approximately 21 wt. %, or from approximately 19 wt. % to approximately 20 wt. %.

Silicon Dioxide

In some embodiments, the compositions provided herein include silicon dioxide. Silicon dioxide is an example of a whitening agent. It may also be used as a builder salt for the detergent composition. In some embodiments, the amount of silicon dioxide in the composition may be, for example, at least about 1 wt. %, at least about 2 wt. %, at least about 3 wt. %, at least about 4 wt. %, at least about 5 wt. %, at least about 6 wt. %, at least about 7 wt. %, at least about 8 wt. %, at least about 9 wt. %, at least about 10 wt. %, at least about 11 wt. %, at least about 12 wt. %, at least about 13 wt. %, at least about 14 wt. %, at least about 15 wt. %, at least about 16 wt. %, at least about 17 wt. %, at least about 18 wt. %, at least about 19 wt. %, at least about 20 wt. %, at least about 25 wt. %, at least about 30 wt. %, or within a range defined by any two of the aforementioned concentrations. For example, in some embodiments, the amount of silicon dioxide present in the composition will range from, for example, approximately 1 wt. % to approximately 8 wt. %, from approximately 2 wt. % to approximately 7 wt. %, from approximately 3 wt. % to approximately 6 wt. %, from approximately 4 wt. % to approximately 5 wt. %, from approximately 11 wt. % to approximately 18 wt. %, from approximately 12 wt. % to approximately 17 wt. %, from approximately 13 wt. % to approximately 16 wt. %, or from approximately 14 wt. % to approximately 15 wt. %.

Cocamidopropyl Betaine

In some embodiments, the compositions provided herein include cocamidopropyl betaine (CAPB). CAPB is an example of a fatty acid amide, consisting of both a quaternary ammonium cation and a carboxylate, and may be used as a surfactant. CAPB can also be used as a co-surfactant, promoting the formation of gas hydrates. In some embodiments, the amount of CAPB in the composition may be, for example, at least about 1 wt. %, at least about 2 wt. %, at least about 3 wt. %, at least about 4 wt. %, at least about 5 wt. %, at least about 6 wt. %, at least about 7 wt. %, at least about 8 wt. %, at least about 9 wt. %, at least about 10 wt. %, at least about 11 wt. %, at least about 16 wt. %, at least about 21 wt. %, or within a range defined by any two of the aforementioned concentrations. For example, in some embodiments, the amount of CAPB present in the composition will range from, for example, approximately 2 wt. % to approximately 9 wt. %, from approximately 3 wt. % to approximately 8 wt. %, from approximately 4 wt. % to approximately 7 wt. %, or from approximately 5 wt. % to approximately 6 wt. %.

Glycerol

In some embodiments, the compositions provided herein include glycerol. Glycerol is an example of a carrier. In some embodiments, the amount of glycerol in the composition may be, for example, at least about 1 wt. %, at least about 2 wt. %, at least about 3 wt. %, at least about 4 wt. %, at least about 5 wt. %, at least about 6 wt. %, at least about 7 wt. %, at least about 8 wt. %, at least about 13 wt. %, at least about 18 wt. %, or within a range defined by any two of the aforementioned concentrations. For example, in some embodiments, the amount of glycerol present in the composition will range from, for example, approximately 1 wt. % to approximately 4 wt. %, or from approximately 2 wt. % to approximately 3 wt. %.

Citrate

In some embodiments, the compositions provided herein include salts of citrate, preferably the sodium salt. Citrate is an example of a chelator. It may also be used as a buffer or builder for the detergent composition. In some embodiments, the amount of citrate in the composition may be, for example, at least about 1 wt. %, at least about 2 wt. %, at least about 3 wt. %, at least about 4 wt. %, at least about 5 wt. %, at least about 6 wt. %, at least about 7 wt. %, at least about 8 wt. %, at least about 13 wt. %, at least about 18 wt. %, or within a range defined by any two of the aforementioned concentrations. For example, in some embodiments, the amount of sodium citrate present in the composition will range from, for example, approximately 1 wt. % to approximately 4 wt. %, or from approximately 2 wt. % to approximately 3 wt. %.

Cocoamidoproplyamine Oxide

In some embodiments, the compositions provided herein include cocamidopropylamine oxide. Cocoamidoproplyamine oxide is an example of a non-ionic surfactant. It may also be used as a co-surfactant, reducing the total active requirements of other foaming ingredients. In some embodiments, the amount of cocamidopropylamine oxide in the composition may be, for example, at least about 1 wt. %, at least about 2 wt. %, at least about 3 wt. %, at least about 4 wt. %, at least about 5 wt. %, at least about 6 wt. %, at least about 7 wt. %, at least about 8 wt. %, at least about 13 wt. %, at least about 18 wt. %, or within a range defined by any two of the aforementioned concentrations. For example, in some embodiments, the amount of cocamidopropylamine oxide present in the composition will range from, for example, approximately 1 wt. % to approximately 4 wt. %, or from approximately 2 wt. % to approximately 3 wt. %.

Saponins

In some embodiments, the compositions provided herein include saponins. Saponins is an example of a non-ionic surfactant. It may also be used as a co-surfactant, reducing the total active requirements of other foaming ingredients. In some embodiments, the amount of saponins in the composition may be, for example, at least about 1 wt. %, at least about 2 wt. %, at least about 3 wt. %, at least about 4 wt. %, at least about 5 wt. %, at least about 6 wt. %, at least about 7 wt. %, at least about 8 wt. %, at least about 13 wt. %, at least about 18 wt. %, or within a range defined by any two of the aforementioned concentrations. For example, in some embodiments, the amount of saponins present in the composition will range from, for example, approximately 1 wt. % to approximately 4 wt. %, or from approximately 2 wt. % to approximately 3 wt. %.

Phenoxyethanol

In some embodiments, the compositions provided herein include phenoxyethanol. Phenoxyethanol is an example of a preservative. In some embodiments, the amount of phenoxyethanol in the composition may be, for example, at least about 0.01 wt. %, at least about 0.1 wt. %, at least about 1 wt. %, at least about 2 wt. %, at least about 3 wt. %, at least about 4 wt. %, at least about 5 wt. %, at least about 6 wt. %, or within a range defined by any two of the aforementioned concentrations. For example, in some embodiments, the amount of phenoxyethanol present in the composition will range from, for example, approximately 0.01 wt. % to approximately 2 wt. %, or from approximately 0.1 wt. % to approximately 1 wt. %.

Proteases, Such a Subtilisin Protease

In some embodiments, the compositions provided herein include a protease, for example subtilisin protease. Proteases are examples of enzymes. In some embodiments, the amount of subtilisin protease in the composition may be, for example, at least about 0.01 wt. %, at least about 0.1 wt. %, at least about 1 wt. %, at least about 2 wt. %, at least about 3 wt. %, at least about 4 wt. %, at least about 5 wt. %, at least about 6 wt. %, or within a range defined by any two of the aforementioned concentrations. For example, in some embodiments, the amount of subtilisin protease present in the composition will range from, for example, approximately 0.01 wt. % to approximately 2 wt. %, or from approximately 0.1 wt. % to approximately 1 wt. %.

Kaolin

In some embodiments, the compositions provided herein include kaolin. Kaolin is a clay mineral, with the chemical composition $Al_2Si_2O_5(OH)_4$; it is a layered silicate mineral and example of an adjunct in cleansing compositions known for its ability to absorb oil and water. In some embodiments, the amount of kaolin in the composition may be, for example, at least about 2 wt. %, at least about 3 wt. %, at least about 4 wt. %, at least about 5 wt. %, at least about 6 wt. %, at least about 7 wt. %, at least about 8 wt. %, at least about 9 wt. %, at least about 10 wt. %, at least about 11 wt. %, at least about 12 wt. %, at least about 13 wt. %, at least about 14 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, or within a range defined by any two of the aforementioned concentrations. For example, in some embodiments, the amount of kaolin present in the composition will range from, for example, approximately 13 wt. % to approximately 20 wt. %, from approximately 14 wt. % to approximately 19 wt. %, from approximately 15 wt. % to approximately 18 wt. %, or from approximately 16 wt. % to approximately 17 wt. %, or from approximately 6 wt. % to approximately 9 wt. %, or from approximately 7 wt. % to approximately 8 wt. %.

Citric Acid

In some embodiments, the compositions provided herein include citric acid. Citric acid is an example of a pH adjuster. It may also be used as a buffer. In some embodiments, the amount of citric acid in the composition may be, for example, at least about 0.01 wt. %, at least about 0.1 wt. %, at least about 1 wt. %, at least about 2 wt. %, at least about 3 wt. %, at least about 4 wt. %, at least about 5 wt. %, at least about 6 wt. %, or within a range defined by any two of the aforementioned concentrations. For example, in some embodiments, the amount of citric acid present in the composition will range from, for example, approximately 0.01 wt. % to approximately 2 wt. %, or from approximately 0.1 wt. % to approximately 1 wt. %.

In some embodiments, the compositions provided herein include small amounts of water. In some embodiments, the amount of water in the composition may be, for example, at least about 1 wt. %, at least about 2 wt. %, at least about 3 wt. %, at least about 4 wt. %, at least about 5 wt. %, at least about 6 wt. %. For example, in some embodiments, the amount of water present in the composition will range from, for example, approximately 1 wt. % to approximately 3 wt. %, from approximately 2 wt. % to approximately 4 wt. % In some embodiments, the water or other solvents in the final composition provided herein may be evaporated or otherwise removed during the manufacturing process, forming a liquidless product, substantially free of water.

In some embodiments, a cleansing composition is provided comprising coco-glucoside, sodium coco-sulfate, silicon dioxide, cocamidopropyl betaine, glycerol; sodium citrate, cocamidopropylamine oxide, saponins, phenoxyethanol, subtilisin protease, kaolin, citric acid, water, and at least one of the following: hydroxyethyl cellulose; gum acacia; cellulose; *Zea mays* starch; *Oryza sativa* starch; sodium polyitaconate; a natural polymer solution; hydroxypropyl cellulose; tapioca starch; or poly(2-ethyl-2-oxazoline). In some embodiments, the composition is substantially free of polyvinyl alcohol.

In some embodiments, the compositions provided herein is a laundry detergent product. In some embodiments, the compositions provided herein may be formed into a solid tablet. In some embodiments, the compositions provided herein may be formed into a solid sheet. In some embodiments, the compositions provided herein may be formed with a thickness between 0.1 mm to 1 mm, 1 mm to 5 mm, or 5 mm to 10 mm, including individual values and sub-ranges within the indicated range.

In some embodiments, the compositions provided herein may have a percent modern carbon (pMC) from about 50% to about 60%, or about 60% to about 70%, or about 70% to about 80%, or about 80% to about 90%, or about 90% to about 100%. In some embodiments, the compositions provided herein may have a pMC over about 50%, or over about 60%, or over about 70%, or over about 80%, or over about 90%, or over about 95%, or over about 99%.

In some embodiments, the $^{14}C/^{12}C$ ratios of the compositions provided herein are similar to those as modern atmospheric $^{14}C/^{12}C$ ratios.

EXAMPLES

Example 1

Materials used in preparing liquidless cleansing compositions described herein may be made by known methods or are commercially available. It is also possible to make use of variants which are themselves known to those of ordinary skill in this art, but are not mentioned in greater detail. The skilled artisan given the literature and this disclosure is well equipped to prepare the formulations of the instant application.

Representative compositions are shown in Table 1 below, with the amounts for Examples A and B.

TABLE 1

| Component | Example A (wt. %) | Example B (wt. %) |
|---|---|---|
| Coco-glucoside | 5-25 | 5-15 |
| Sodium coco-sulfate | 10-30 | 15-25 |
| Silicon dioxide | 1-20 | 1-10 |
| Cocamidopropyl betaine | 1-20 | 5-15 |
| Glycerol | 1-20 | 1-10 |
| Sodium citrate | 1-20 | 1-10 |
| Cocamidopropylamine oxide | 1-20 | 1-10 |
| Saponins | 1-20 | 1-10 |
| Phenoxyethanol | 0.1-15 | 0.1-5 |
| Subtilisin protease | 0.1-15 | 0.1-5 |
| Kaolin | 5-25 | 5-20 |
| Citric acid | 0.1-15 | 0.1-5 |
| Hydroxyethyl cellulose | 10-30 | 15-25 |
| Water | 0-25 | 0-15 |

Certain Terminology

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. Furthermore, where the terms "and" and "or" are used in conjunction with a list of items, they are to be interpreted broadly, in that any one or more of the listed items may be used alone or in combination with other listed items.

What is claimed is:

1. A laundry detergent sheet, comprising:

(a) 5-35 wt. % of a polysaccharide-based polymer matrix, said polysaccharide-based matrix configured in the form of a water-soluble sheet comprising 17-23 wt. % hydroxyethyl cellulose and at least 5% starch;

b) detergent components including a surfactant system comprising:

i) 0.1-30 wt. % of a neutrally charged surfactant;

ii) 1-15 wt. % of an anionic surfactant; and iii) 0.1-4 wt. % saponin;

c) 4-12 wt. % modified silica; and d) an organomodified silicone polymers with aryl or alkylaryl substituents combined with silicone resin; and wherein the laundry detergent sheet contains no detectable amount of polyvinyl alcohol.

2. The laundry detergent sheet of claim 1, wherein the percentage of plant-based carbon in the polysaccharide-based polymer matrix is between 80% to 90%.

3. The laundry detergent sheet of claim 1, wherein the laundry detergent sheet is substantially free of fossil-fuel based carbon.

4. The laundry detergent sheet of claim 1, wherein the laundry detergent sheet is formed with a thickness between 0.1 mm and 10 mm.

5. The laundry detergent sheet of claim 1, further comprising 0.001 wt. % to 0.5 wt % of an enzyme composition.

6. The laundry detergent sheet of claim 5, further comprising an enzyme stabilizing system.

7. The laundry detergent sheet of claim 5, wherein the enzyme composition comprises a protease, a lipase, and an amalyase.

8. The laundry detergent sheet of claim 7, wherein the protease is subtilisin protease.

9. The laundry detergent sheet of claim 6, wherein the enzyme stabilizing system comprises a boron compound as a reversible protease inhibitor.

10. The laundry detergent sheet of claim 5, further comprising at least about 1 wt. % fatty acid amide.

11. The laundry detergent sheet of claim 10, wherein the fatty acid amide is cocamidopropyl betaine.

12. The laundry detergent sheet of claim 11, further comprising at least 3 wt. % kaolin.

13. The laundry detergent sheet of claim 1, further comprising fabric enhancement polymers and phenoxyethanol.

14. The laundry detergent sheet of claim 1, wherein the neutrally charged surfactant comprises zwitterionic surfactant.

15. The laundry detergent sheet of claim 1, wherein the neutrally charged surfactant comprises amphoteric surfactant.

16. The laundry detergent sheet of claim 1, wherein the laundry detergent sheet comprises no more than 10 wt. % water.

17. The laundry detergent sheet of claim 16, wherein the laundry detergent sheet is substantially free of water.

18. The laundry detergent sheet of claim 1, further comprising a non-ionic surfactant other than saponin.

19. The laundry detergent sheet of claim 18, wherein the non-ionic surfactant is selected from the group consisting of coco-glucoside, coamidopropylamine oxide, and combinations thereof.

* * * * *